March 10, 1970  H. J. JEFFERYS  3,499,254
STEP CONSTRUCTION
Filed Dec. 1, 1967  9 Sheets-Sheet 1
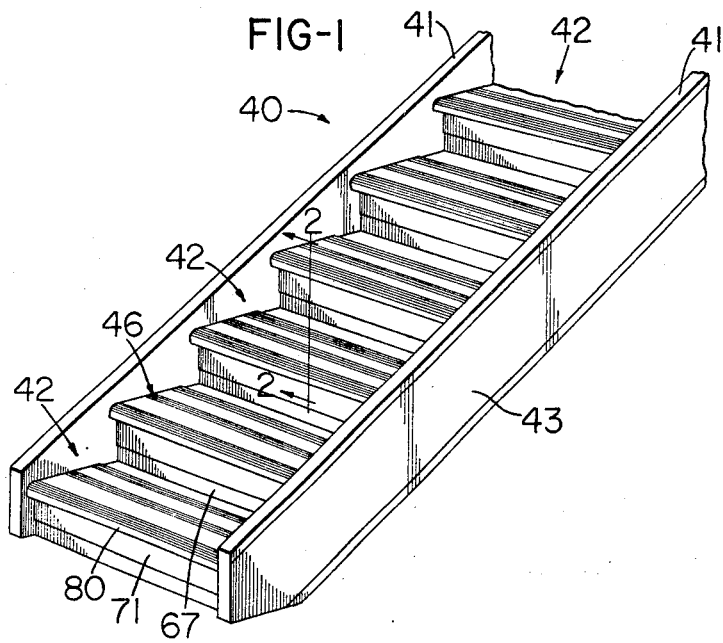
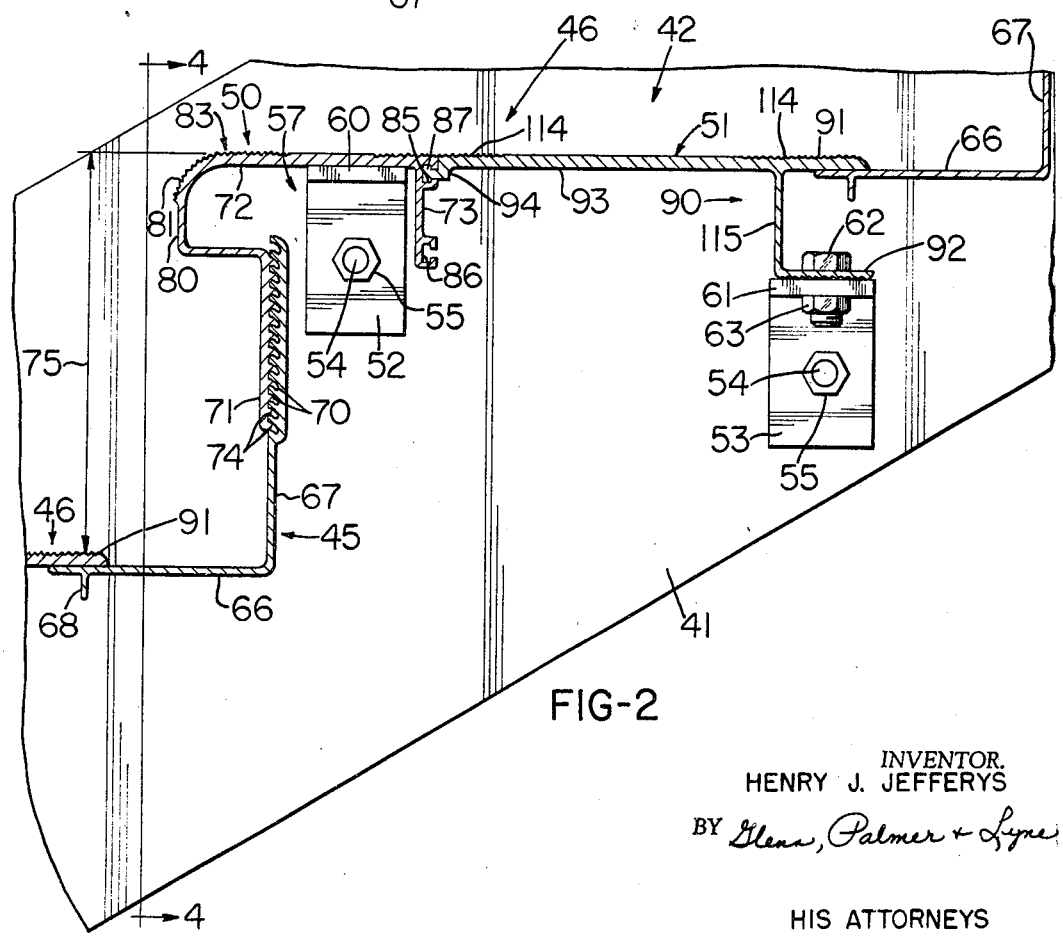
INVENTOR.
HENRY J. JEFFERYS
BY Glenn, Palmer + Lyne
HIS ATTORNEYS

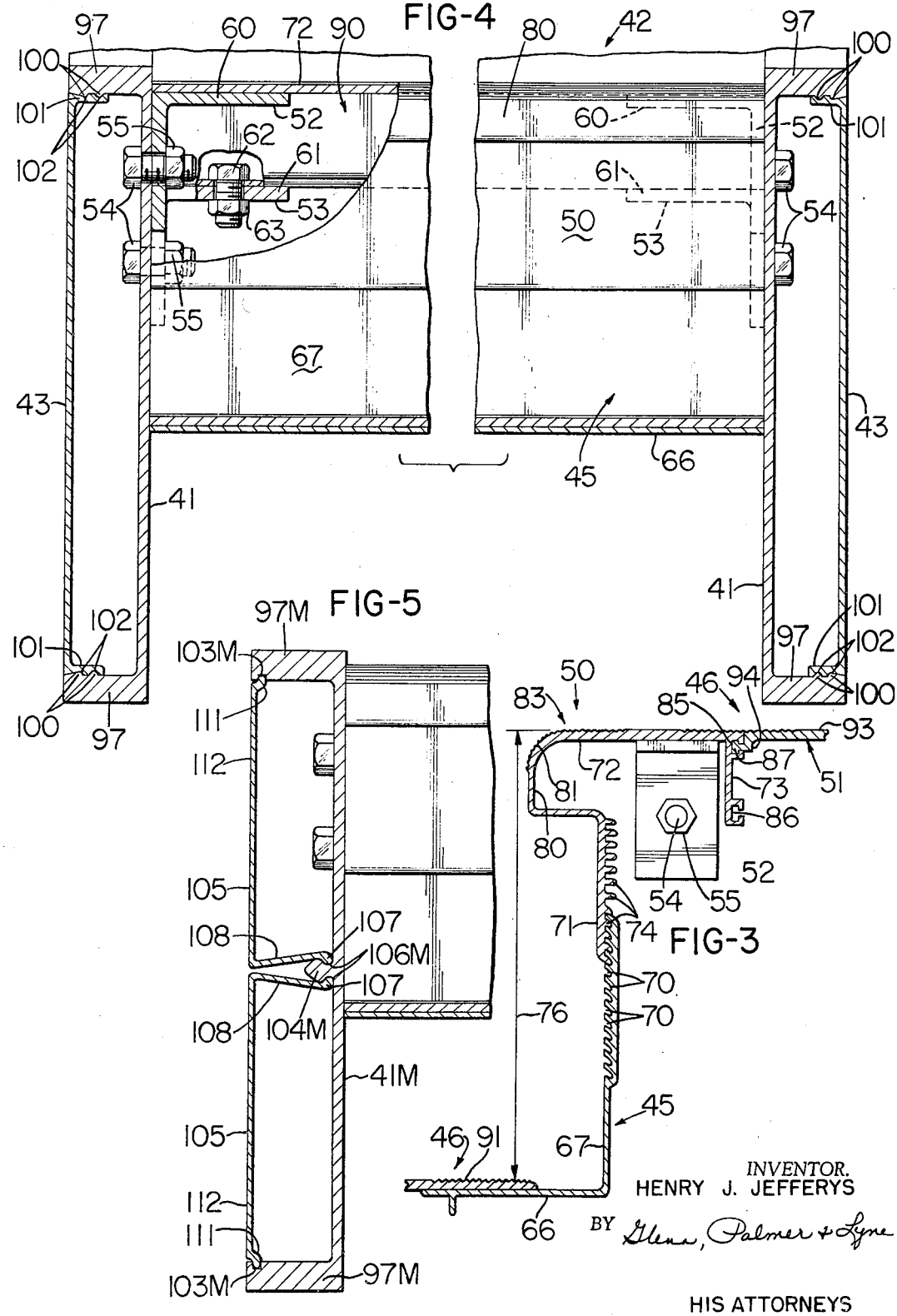

March 10, 1970  H. J. JEFFERYS  3,499,254
STEP CONSTRUCTION
Filed Dec. 1, 1967  9 Sheets-Sheet 3
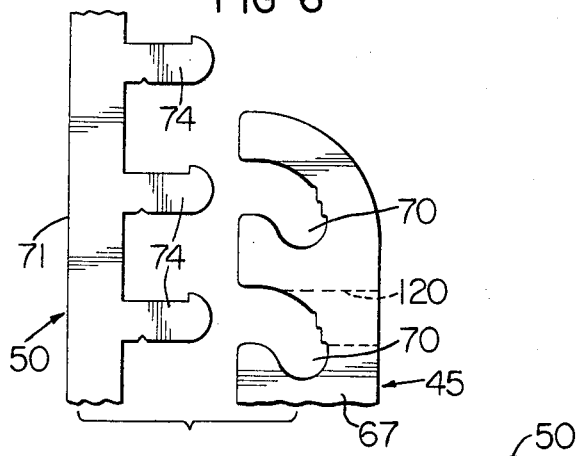
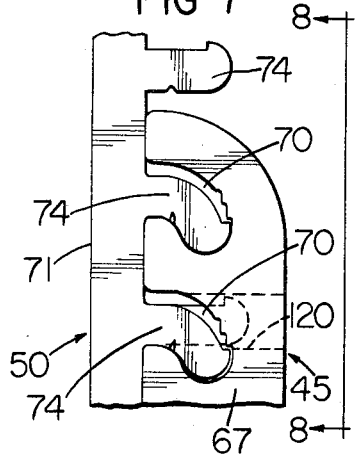
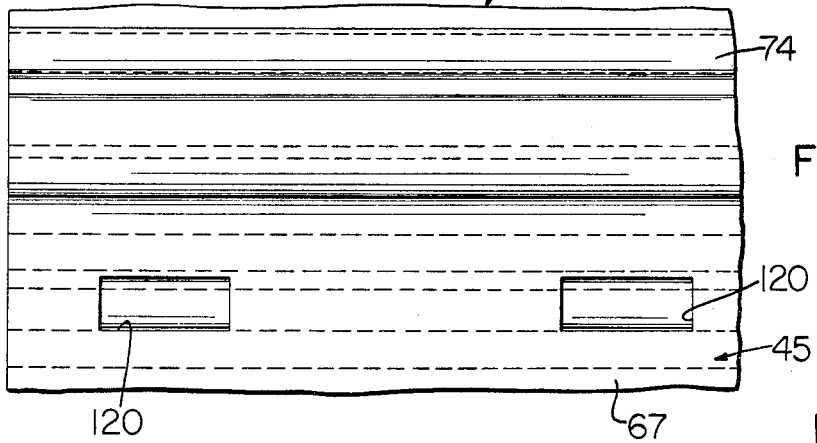
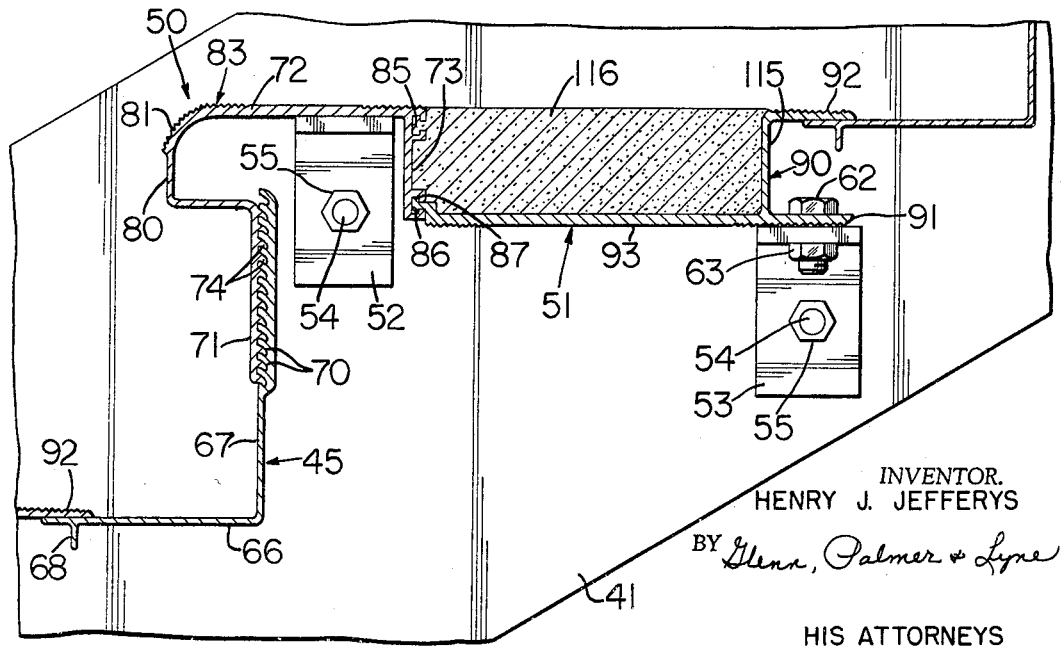
INVENTOR.
HENRY J. JEFFERYS
BY Glenn, Palmer & Lyne
HIS ATTORNEYS March 10, 1970 H. J. JEFFERYS 3,499,254
STEP CONSTRUCTION
Filed Dec. 1, 1967 9 Sheets-Sheet 4
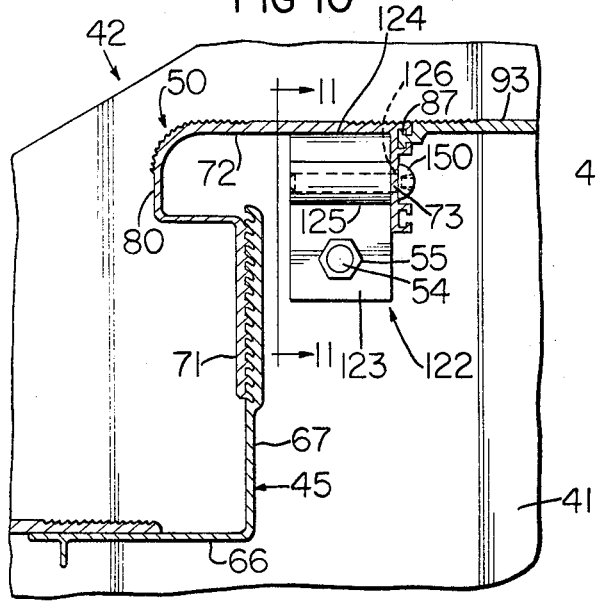
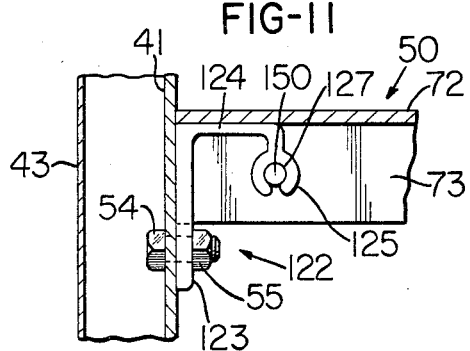
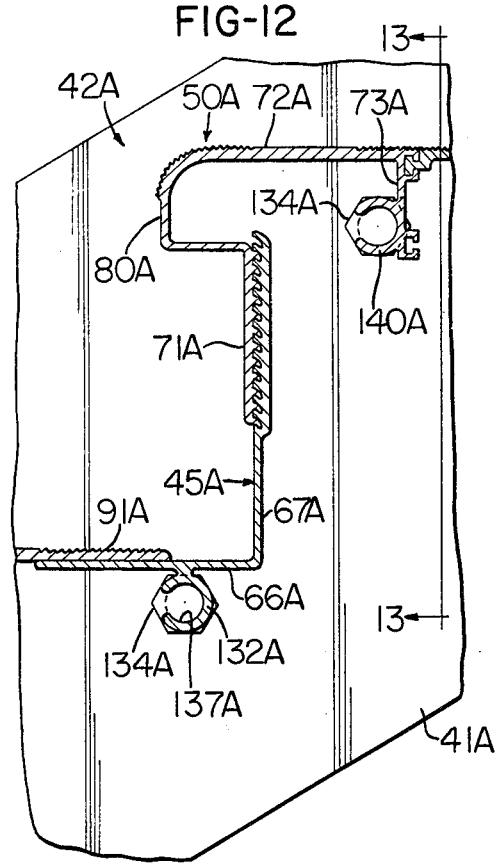
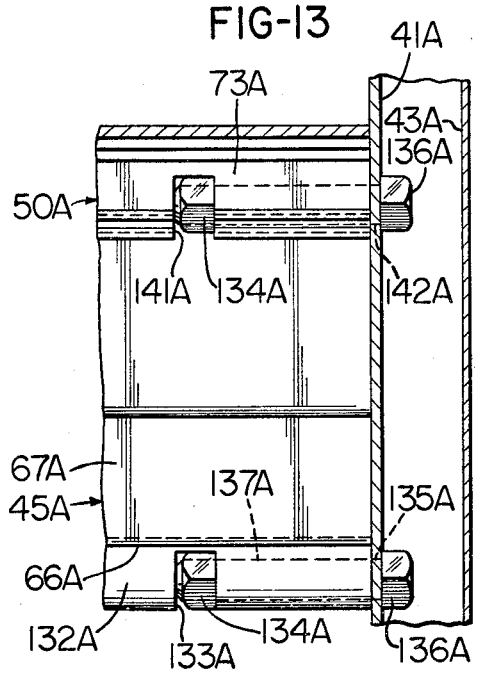
INVENTOR.
HENRY J. JEFFERYS
BY Glenn, Palmer + Lyne
HIS ATTORNEYS March 10, 1970 — H. J. JEFFERYS — 3,499,254
STEP CONSTRUCTION
Filed Dec. 1, 1967 — 9 Sheets-Sheet 5

*INVENTOR.*
HENRY J. JEFFERYS
BY Glenn, Palmer + Lyne
HIS ATTORNEYS

March 10, 1970     H. J. JEFFERYS     3,499,254
STEP CONSTRUCTION
Filed Dec. 1, 1967                                            9 Sheets-Sheet 6
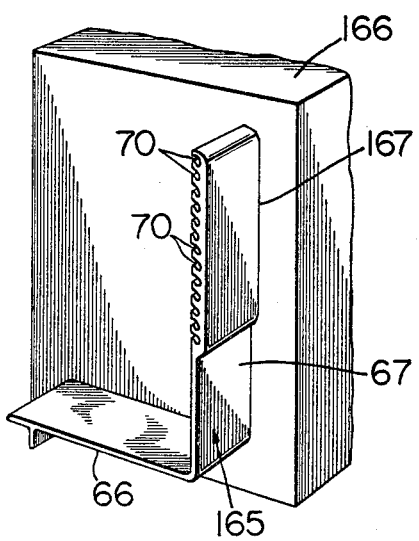
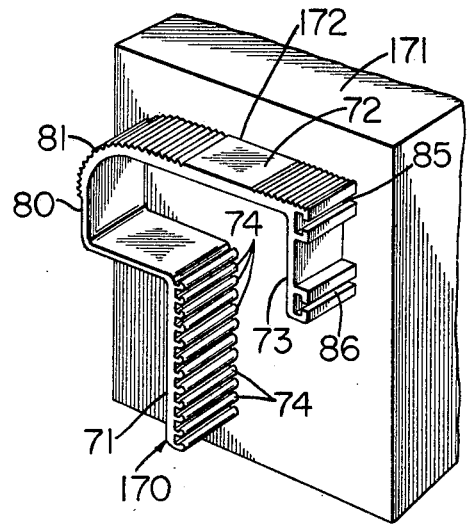
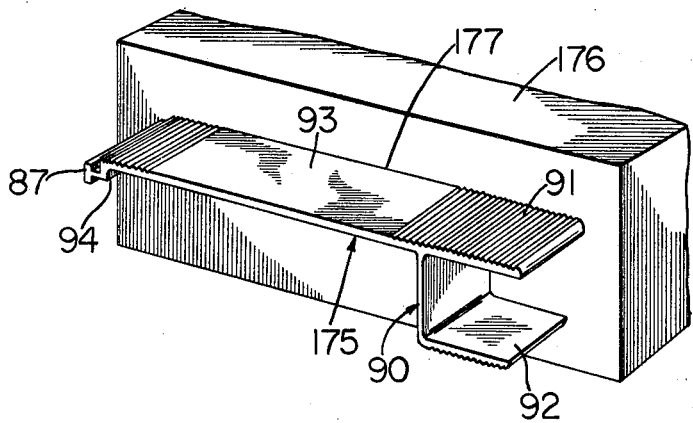
INVENTOR.
HENRY J. JEFFERYS
BY *Glenn, Palmer & Lyne*
HIS ATTORNEYS

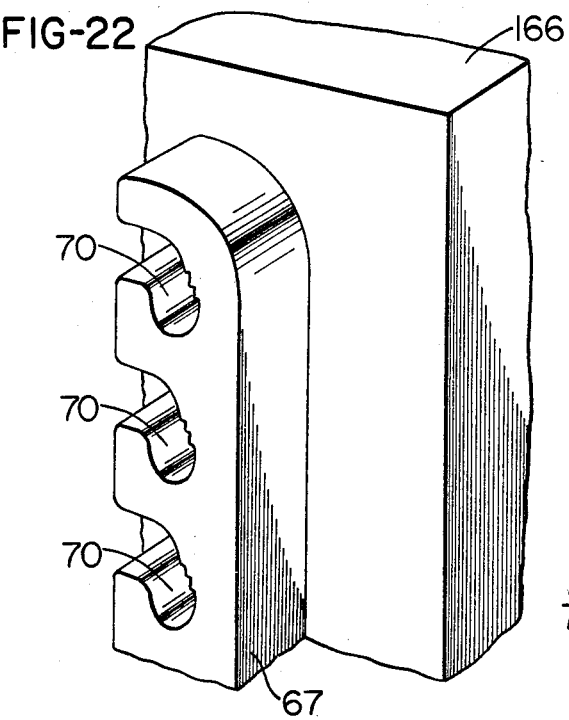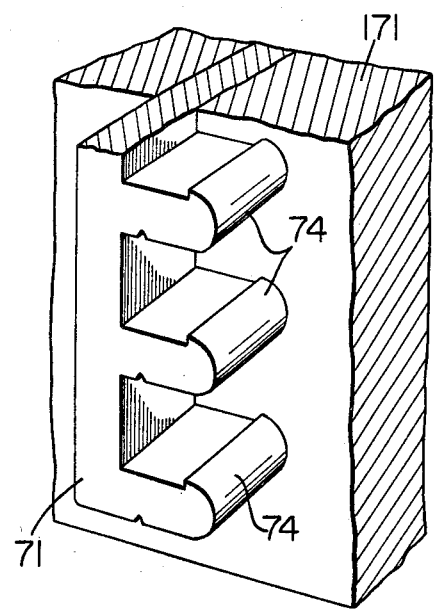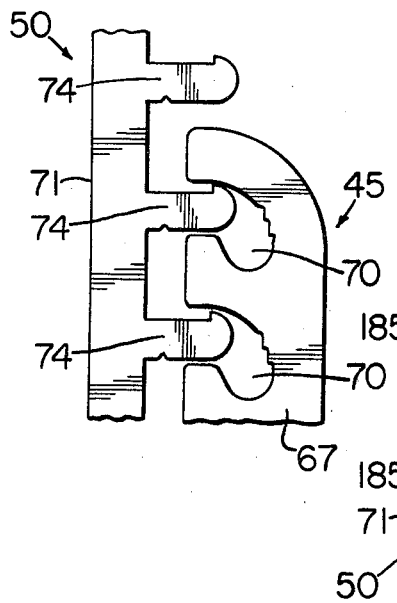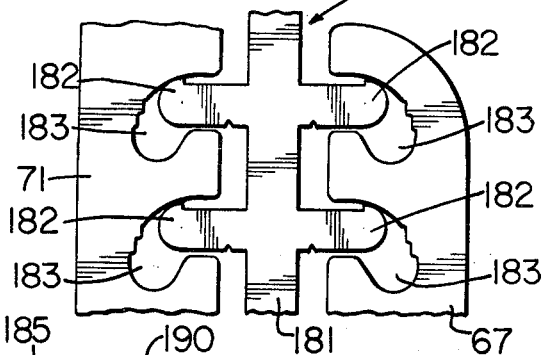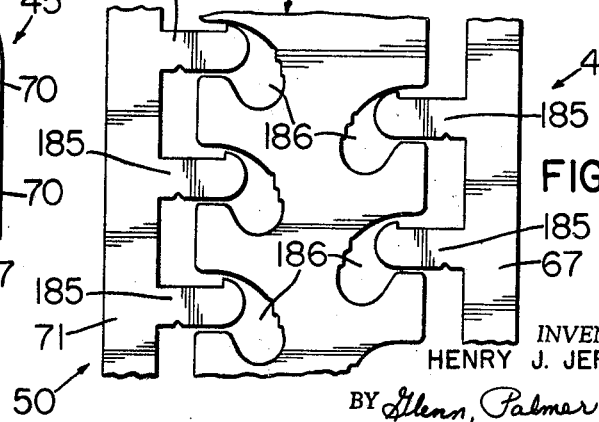

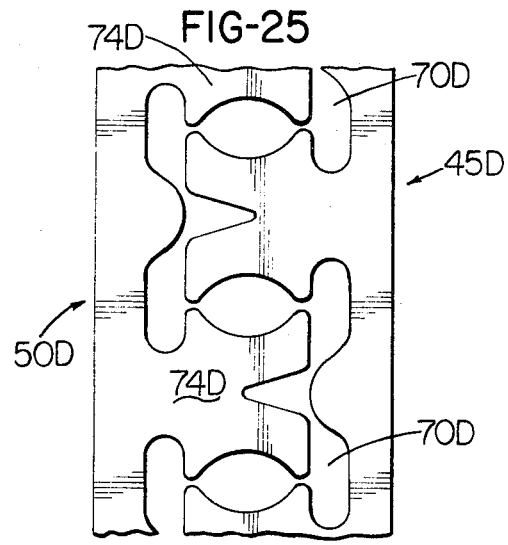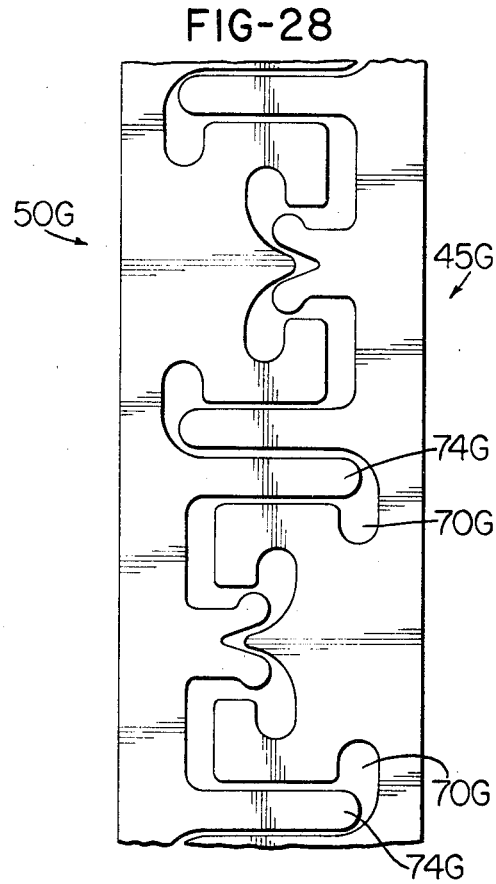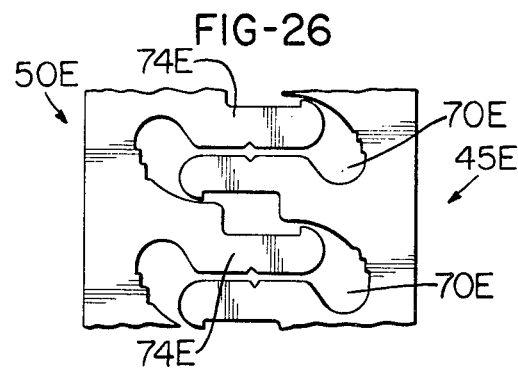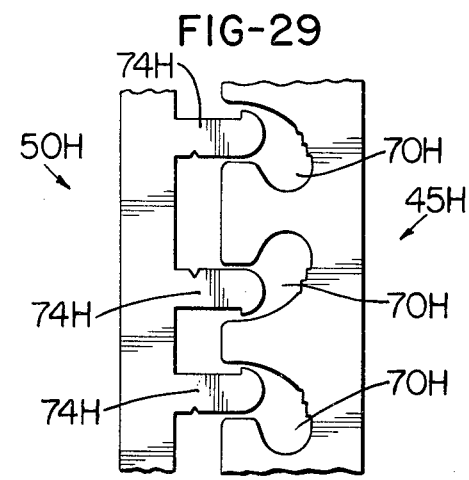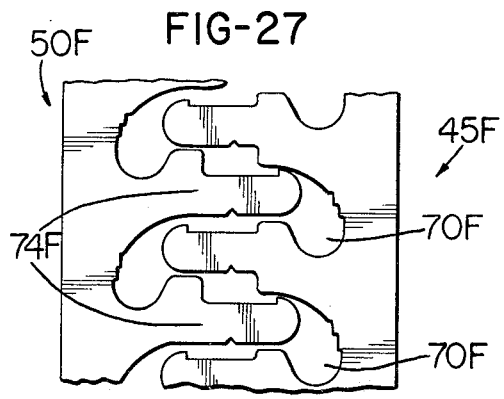

March 10, 1970   H. J. JEFFERYS   3,499,254
STEP CONSTRUCTION
Filed Dec. 1, 1967   9 Sheets-Sheet 9
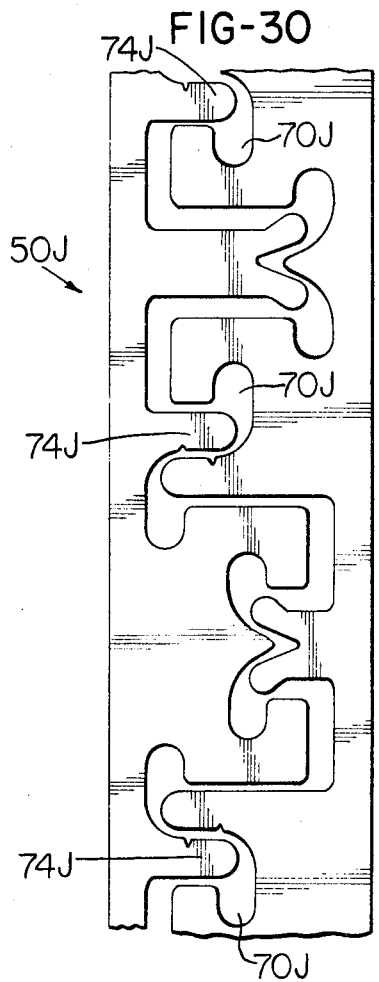
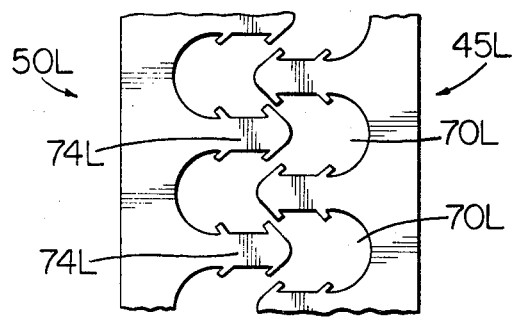
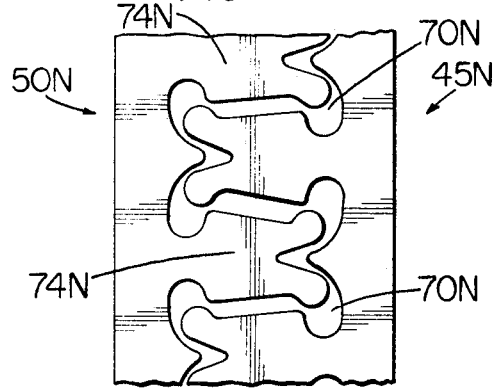
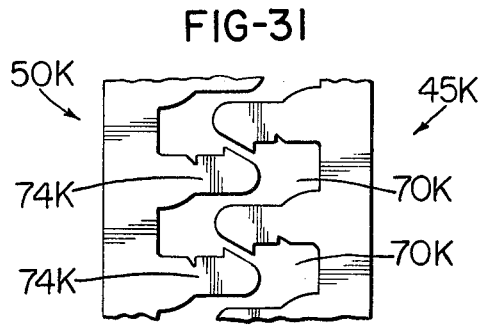
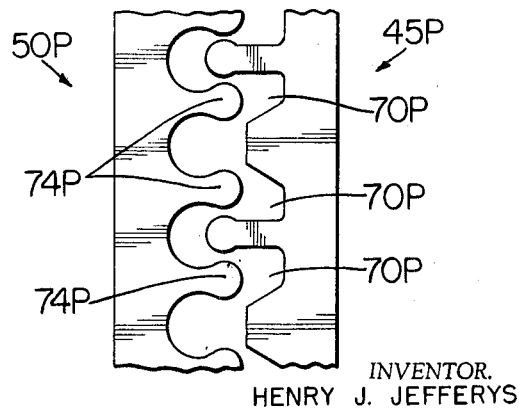
INVENTOR.
HENRY J. JEFFERYS
BY Glenn, Palmer & Lyne
HIS ATTORNEYS

United States Patent Office 3,499,254
Patented Mar. 10, 1970

3,499,254
STEP CONSTRUCTION
Henry J. Jefferys, Sabot, Va., assignor to Reynolds Metals Company, Richmond, Va., a corporation of Delaware
Filed Dec. 1, 1967, Ser. No. 687,174
Int. Cl. B04f 11/12, 11/16
U.S. Cl. 52—179
6 Claims

ABSTRACT OF THE DISCLOSURE

This disclosure relates to a step assembly having a riser which is adjustable and a tread comprised of a tread nosing and a reversible tread pan which defines a horizontal surface in one of its positions and provides an integral pan-like mold for receiving a step-forming material in its reversed position.

BACKGROUND OF THE INVENTION

In providing a plurality of step assemblies or steps in a stairway construction it is desirable to fabricate such stairway inexpensively, having high strength, and utilizing standardized component parts which may be fastened together in such a manner that the vertical height of the riser of each step assembly as well as the tread width may be varied to suit the particular application. In addition, it is highly desirable that the standardized component parts be constructed to enable them to be used in applications where it is preferred that the tread be comprised of a material such as terrazzo, or the like, yet without requiring additional special forms and expensive component parts to enable proper installation of the terrazzo.

SUMMARY

This invention provides an improved step assembly comprised of a riser which is adjustable in height and a tread which is adjustable in width and is capable of being reversed so that in one of its positions it defines a substantially horizontal walking surface and in its reversed position it defines an integral pan-like mold for receiving a step-forming material.

Other details, uses, and advantages of this invention will become apparent as the following description of the embodiments thereof presented in the accompanying drawings proceeds.

BRIEF DESCRIPTION OF THE DRAWINGS

The accompanying drawings show present preferred embodiments of this invention, in which:

FIGURE 1 is a perspective view with a portion thereof broken away illustrating a stairway which utilizes a plurality of improved step assemblies of this invention;

FIGURE 2 is a sectional view with parts broken away taken on the line 2—2 of FIGURE 1 and particularly illustrating a riser and a tread nosing of a step assembly suitably fastened together to provide a minimum riser height;

FIGURE 3 is a fragmentary sectional view similar to FIGURE 2 and particularly illustrating the riser and tread nosing comprising the step assembly of FIGURE 2 fully extended to illustrate a greater step height which may be provided by reducing the number of cooperating projections and grooves provided in the riser and tread nosing which are suitably intermeshed to fasten such riser and tread nosing together;

FIGURE 4 is a view with parts in section and parts broken away taken on the line 4—4 of FIGURE 2 and illustrating one embodiment of a single piece cover provided in association with each stringer comprising the stairway of FIGURE 1;

FIGURE 5 is a fragmentary view with parts in section and parts broken away particularly illustrating another embodiment of a stringer and two-piece cover therefor which may be used in lieu of each stringer illustrated in FIGURE 4 of the drawings;

FIGURE 6 is an enlarged fragmentary end view illustrating a plurality of grooves provided in the vertical leg of the riser of FIGURE 2 and cooperating projections provided in the vertical leg of the tread nosing of FIGURE 2 prior to interlocking such vertical legs together;

FIGURE 7 is an end view similar to FIGURE 6 illustrating the projections provided in the vertical leg portion of the tread nosing mechanically deformed within associated grooves in the vertical leg portion of the riser;

FIGURE 8 is a fragmentary view taken on the line 8—8 of FIGURE 7 particularly illustrating a plurality of rectangular cutouts provided in the vertical leg of the riser to prevent stress concentrations;

FIGURE 9 is a view similar to FIGURE 2 illustrating the reversible pan comprising the tread of the step assembly in its reversed position so as to define a pan-like mold for receiving a step forming material such as terrazzo, or the like;

FIGURE 10 is a view similar to FIGURE 2 with parts broken away and illustrating another embodiment of a pair of supports used to support the forward end of a step assembly to an associated stringer;

FIGURE 11 is a view on the line 11—11 of FIGURE 10;

FIGURE 12 is a view similar to FIGURE 2 and particularly illustrating a pair of integral substantially C-shaped ribs each extending the full length of the riser and tread nosing respectively and each being utilized in association with fastening bolts to fasten the riser and tread nosing at its opposite ends to associated stringers;

FIGURE 13 is a view on the line 13—13 of FIGURE 12 particularly illustrating a typical cutout adjacent one end of each C-shaped rib which is adapted to receive a fastening nut therewithin;

FIGURE 19 is a fragmentary perspective view illustrating an elongated member being extruded through an associated die and having the identical cross-sectional configuration of a riser so that each riser of a step assembly may be made therefrom merely by cutting the extruded member to the desired length;

FIGURE 20 is a fragmentary perspective view similar to FIGURE 19 and illustrating an elongated member being extruded through an associated die to define a member having the identical cross-sectional configuration of a tread nosing so that each tread nosing may be made therefrom by cutting to the desired length;

FIGURE 21 is a fragmentary perspective view similar to FIGURE 19 illustrating an elongated member being extruded through an associated die wherein such member may be cut to length to define the reversible tread pan of FIGURE 2;

FIGURE 22 is an enlarged fragmentary perspective view particularly illustrating a portion of the die of FIGURE 19 and associated integral grooves comprising a part of the riser being extruded therethrough;

FIGURE 23 is an enlarged fragmentary perspective view of a portion of the die of FIGURE 20 particularly illustrating cooperating projections comprising a part of the tread nosing and which are to be inserted and mechanically deformed within cooperating grooves of an associated riser;

FIGURE 24 is an enlarged fragmentary end view particularly illustrating the manner of placing the projections of the tread nosing formed as shown in FIGURE 23 within cooperating grooves of the riser formed as shown in FIGURE 22 prior to mechanical deformation thereof to fasten the two members together;

FIGURES 25 through 34 illustrate various embodiments of projections and grooves which may be provided in association with either the vertical leg of a stringer or a tread nosing showing each set of such projections and grooves arranged together prior to mechanical interlocking thereof;

FIGURE 35 is a fragmentary view particularly illustrating one embodiment of an intermediate member used to interlock a riser and tread nosing together; and FIGURE 36 is a view similar to 35 and illustrates another embodiment of an intermediate member used to interlock a riser and tread nosing together.

DESCRIPTION OF ILLUSTRATED EMBODIMENT

Figure 14:
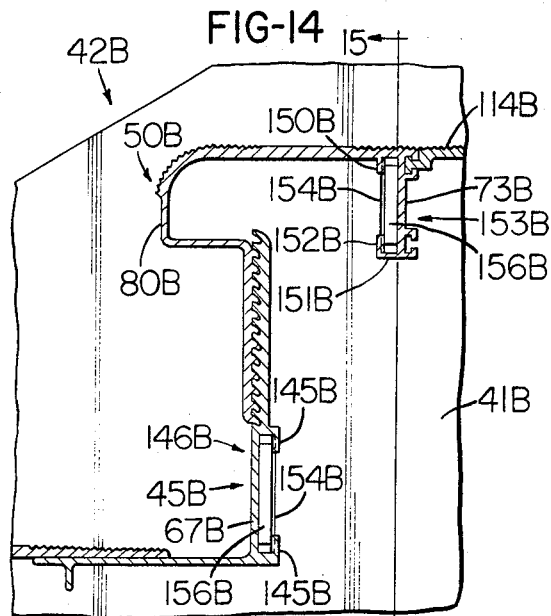
FIGURE 14 is a view similar to FIGURE 2 illustrating another embodiment of a pair of substantially C-shaped ribs each extending the full length of a riser and tread nosing respectively and each being adapted to have each end thereof supported by an associated supporting wedge which is inserted through a cooperating opening provided in an associated stringer.

In the exemplary embodiment of this invention illustrated in FIGURE 1 of the drawings an improved stairway or step construction 40 is illustrated having a pair of identical spaced apart stringers 41 and a plurality of step assemblies each designated generally by the numeral 42 and only a representative few of such step assemblies being so designated. Each stringer 41 of the stairway 40 has a cover 43 provided along its outer exposed surface so as to provide a construction having a pleasing external appearance.

As seen particularly in FIGURE 2 of the drawings each step assembly is comprised of a substantially L-shaped riser 45 and a tread indicated generally by the numeral 46 which has a substantially horizontal surface in one of its positions illustrated in FIGURE 2 and has a portion which is reversible to define an integral pan-like mold for receiving a step-forming material, such as terrazzo, or the like, essentially as illustrated in FIGURE 9 of the drawings.

Each tread 46 is comprised of a tread nosing 50 which is fastened to the riser 45 and a reversible tread pan 51 fastened to the tread nosing and defining the central part of the horizontal surface of tread 46. The pan 51 is adapted to be reversed to define parts of a pan-like mold as will be described in detail subsequently.

In the exemplary embodiment of this invention illustrated in FIGURES 1 through 4 a suitable support is utilized for supporting each end of each step assembly 42 to an associated stringer 41. In particular, it will be seen that two L-shaped supports 52 and 53 are utilized at each end. Each L-shaped support 52 and 53 is fastened to an associated stringer 41 by a bolt 54 which extends through cooperating aligned openings provided in the particular L-shaped support and associated stringer 41 and a nut 55 used in association with each bolt 54.

Each L-shaped support 52 is arranged in supporting relation beneath the tread nosing 50 as shown at 57 and allows sliding horizontal movement of the tread nosing 50 along the horizontal leg portion 60 of L-shaped support 52. Similarly, each L-shaped support 53 has a horizontal leg portion 61 which supports the inner end portion of pan 51 and in this example of the invention a bolt 62 and a cooperating nut 63 is used to attach pan 51 to horizontal leg portion 61.

Each end of each step assembly 42 illustrated in the exemplary embodiment of this invention of FIGURES 1–4 of the drawings is effectively fixed to an associated stringer at only one position so that with the tread nosing 50 and pan 51 fastened together and the riser fastened to the vertical leg of the tread nosing each step assembly 42 is capable of moving horizontally relative to stringers 41 to effectively eliminate any tendency for stress buildup.

As seen particularly in FIGURE 2 of the drawings the L-shaped riser 45 of each step assembly 42 has a horizontal leg 66 and a vertical leg 67 and the vertical leg 67 has a plurality of spaced apart grooves 70 extending therein from one vertical surface and arranged therealong in substantially parallel spaced apart relation. An integral strengthening rib 68 is also provided in the horizontal leg 66 of riser 45.

The tread nosing 50 has a substantially vertical leg 71 and a horizontal leg 72 which terminates in a fastening flange 73 provided in its terminal inner end and the vertical leg 71 has a plurality of substantially parallel spaced apart projections 74. The riser 45 and tread nosing 50 are fastened together by inserting a plurality of projections 74 within a corresponding number of grooves 70 provided in leg portion 67 of riser 45 essentially as illustrated in enlarged detail in FIGURE 24 and the projections 74 are then mechanically deformed within cooperating projections 70 to define a construction as illustrated in FIGURES 2 and 7.

The above described fastening technique provides a high strength construction which has optimum structural strength. Furthermore, because of the plurality of parallel spaced apart projections 74 provided in vertical leg 71 of tread nosing 50 and cooperating grooves 70 provided in vertical leg portion 67 of riser 45 it is readily possible to intermesh any desired number of projections and grooves prior to mechanical deformation and thereby adjust the height between the horizontal tread 46 of a pair of adjacent steps so that practically any desired height may be provided.

In particular, FIGURE 2 illustrates the manner in which substantially all of the cooperating projections 74 and grooves 70 are interlocked together to provide the minimum height as shown at 75 between a pair of adjacent horizontal treads 46 while in FIGURE 3 the riser 45 has been fastened in position to the tread nosing 50 so as to provide a maximum height between adjacent horizontal treads 46 as illustrated at 76.

Although the number of projections 74 which are intermeshed and suitably deformed together to provide the adjustable height between a pair of adjacent horizontal treads 46 may vary depending upon the particular configuration of the cooperating projections and grooves, for the particular configuration illustrated in FIGURE 2 of the drawings it is preferred that a minimum number of four projections 74 be inserted and suitably mechanically deformed within four associated cooperating grooves 70 to provide a construction having the desired structural strength. Also, it will be appreciated that in many applications it may be desirable to provide only one projection 74 in tread nosing 50 and an associated groove 70 in riser 45.

Any suitable technique may be utilized for mechanically deforming the projections 74 within associated grooves 70. One technique that has been used successfully is the use of a mechanical press which provides such deformation in a controlled manner.

The substantially L-shaped tread nosing 50 has a vertical leg 71 and a horizontal leg 72 as previously mentioned. The vertical leg 71 has an outwardly offset portion 80 defining its upper end and which is provided with an arcuate transition surface 81 between the upper end of vertical leg 71 and the horizontal leg 72. The tread nosing 50 also has a plurality of integral substantially parallel spaced apart ridges indicated at 83 which define a substantially non-skid walking surface.

The supporting flange 73 comprising tread nosing 50 extends substantially vertically downwardly below the inner end of the horizontal leg portion 72 and is arranged in substantially parallel spaced apart relation with the vertical leg portion 71. The supporting flange 73 is used to support the front part of tread pan 51.

The fastening flange 73 has a pair of identical slots provided therein shown as an upper slot 85 and a lower slot 86. Each slot 85 and 86 is adapted to receive a cooperating T-shaped fastening connector or tongue 87 provided on tread pan 51. Although each slot 85 and 86 may have any desired configuration, in this example of the invention each slot 85 and 86 has a substantially T-shaped cross-sectional configuration.

The pan 51 may be installed so that its T-shaped fastening connector 87 is inserted within either the upper slot 85 as shown in FIGURE 2 or the lower slot 86 as shown in FIGURE 9 to thereby fasten tread nosing 50 to tread pan 51. The construction of each T-shaped slot 85 and 86 is such that it is adapted to be deformed inwardly against T-shaped tongue 87 so as to provide a rattle-free construction.

The pan 51 of each step assembly 42 is defined by a substantially U-shaped portion indicated at 90 having a pair of parallel arms designated by the numerals 91 and 92 respectively and an integral extension 93 extending in the opposite direction from one of its parallel arms illustrated as arm 91 in this exemplary embodiment of the invention. Integral extension 93 has a cooperating fastening flange 94 which has the previously mentioned T-shaped tongue 87 extending outwardly therefrom. Each T-shaped slot 85 and 86 may be mechanically deformed around an associated T-shaped tongue 87 either along its full length or at one or more points along its length to thereby provide a construction which is substantially rattle free.

In the exemplary embodiment of this invention illustrated in FIGURE 2 of the drawings it will be seen that the parallel arm 92 of U-shaped portion 90 is supported on horizontal portion 61 of L-shaped support 53 and suitably bolted thereto utilizing bolt 62 and an associated nut 63.

As seen particularly in FIGURE 4 of the drawings, each stringer 41 has the previously mentioned single piece cover 43 fastened adjacent the terminal outer edges of parallel legs 97 of each stringer 41. Each parallel leg 97 has a pair of ridges each designated by the numeral 100 extending therealong which are utilized to hold single piece cover 43 in position.

Each single piece cover 43 is also substantially U-shaped and has a pair of substantially parallel legs 101 and each leg 101 has a pair of channels 102 provided therein. The cover 43 is snap-fitted into position by pushing its parallel legs 101 within the parallel legs 97 of an associated stringer 41 so that each channel 102 is snapped around an associated ridge 100. The resulting construction is such that a substantially smooth exterior surface is defined by the outside surface of single piece cover 43 and the terminal edge portion of each leg 97 of an associated stringer 41.

Another exemplary embodiment of a stringer is illustrated in FIGURE 5 of the drawings wherein the particular stringer is designated by the numeral 41M and has a pair of parallel legs 97M each having a single groove extending therealong designated by the numeral 103M. The U-shaped stringer 41M also has a central rib 104M extending therealong and projecting in the same direction from its bight or base leg as the parallel legs 97M. A cover is provided for the exposed surface of each stringer 41M in the form of a two-piece cover wherein each piece is designated by the numeral 105 and is substantially L-shaped in configuration.

The central rib 104M comprising stringer 41M has a pair of contoured surfaces 106M extending along its opposite side edges and adapted to receive a cooperating contoured terminal end 107 of one leg portion 108 of each L-shaped cover 105. Each L-shaped cover 105 is also snap-fitted into position by inserting an offset end portion 111 provided in its other leg 112 within a groove 103M provided in an associated parallel leg 97M of stringer 41M, whereby each stringer 41M also has an exposed exterior surface which is substantially smooth and has a pleasing appearance.

As previously described in connection with the tread nosing 50, the pan 51 also has a plurality of parallel spaced apart ridges provided on its outside surface and designated by the numeral 114 at a pair of spaced apart locations. The spaced apart ridges in this example of the invention extend across the full length of each pan 51, are formed as an integral part thereof, and define a non-skid walking surface.

As previously mentioned, the pan 51 is reversible and in its reverse position defines an integral pan-like mold for receiving a step-forming material. The pan-like mold is formed by reversing the pan 51 from the position illustrated in FIGURE 2 to the position illustrated in FIGURE 9 upon inserting the locking T-shaped tongue 87 of pan 51 in the lower T-shaped slot 86 provided on the tread nosing 50. With this arrangement it will be seen that the bottom wall of the pan-like mold is defined by extension 93 of pan 51 and a pair of oppositely arranged side walls extend upwardly from such bottom wall and are defined by supporting flange 73 along one side and the bight 115 of U-shaped portion 90 comprising pan 51 along the other side.

With this arrangement it is a simple matter to build a pan-like mold for receiving a step-forming material such as terrazzo, or the like, and provide a step construction in which the high structural strength components utilized to form the step assembly 42 shown in FIGURE 2 may be utilized to form the assembly illustrated in FIGURE 9 yet without requiring special forms and special installation procedures to install and finish the terrazzo-like material which is indicated by the numeral 116. The unique arrangement of the tread nosing 50 and tread pan 51 is also such that the terrazzo-like material 116 is provided in the central portion of a given step assembly thereby enabling easy access for finishing of the exposed surface thereof with minimum interference by adjoining components.

As previously explained the vertical leg portion 67 of riser 45 is fastened to the vertical leg 71 of tread nosing 50 by mechanically deforming a plurality of projections 74 of leg 71 within associated slots 70 provided in vertical leg 67. The projections 74 and slots 70 are arranged in parallel spaced apart relation and during the process of mechanically intermeshing each projection 74 within an associated slot 70 there is a tendency for the metal to shear adjacent the area of bending or deforming each projection 74 within its associated slot 70. In addition, during repeated loading through continued use there is a greater tendency to create a horizontal shear condition between the intermeshed members.

To preclude the possibility of weakening the structural integrity of the connection between the riser 45 and tread nosing 50 a plurality of cutouts each designated by the same numeral 120 are provided in spaced apart relation in the vertical leg 67 of riser 45 across the length thereof and in association with at least one of the grooves 70 provided therein and such cutouts help reduce or prevent horizontal shear, see FIGURE 8. The cutouts 120 may be arranged in an aligned rectilinear path across the length of the riser 45. However, they may be provided in any desired pattern. With the provision of cutouts 120 it will be appreciated that portions of a projection 74 extending from tread nosing 50 extend through cutouts 120 of vertical leg 67 of riser 45 in an unobstructed manner and thereby potential continuous horizontal shear areas or lines are not set up in either the tread nosing 50 or the riser 45 upon deforming the remaining portions of the particular intermeshed projection 74 in position.

The step assembly illustrated in FIGURE 2 of the drawings is supported in position on a pair of substantially L-shaped supporting flanges designated by the numerals 52 and 53. A modification of the manner of supporting step assembly 42 in position is illustrated in FIGURES 10 and 11 of the drawings wherein the L-shaped support 52 is replaced with a support designated by the numeral 122 which is also substantially L-shaped and has a vertical leg portion 123 and a horizontal leg portion 124 which terminates in a substantially C-shaped supporting flange 125.

The support 122 is fastened to an associated stringer 41 utilizing a bolt 54 and an associated nut 55. The tread nosing 50 has an opening 126 formed therein which extends through its supporting flange 73 and the step assembly 42 is installed in position so that the opening 126 is aligned with an opening 127 provided in the C-shaped fastening flange or screw boss 125. A fastening member such as a fastening screw or pin 150 may be easily inserted through aligned openings 126 and 127 to thereby attach the tread nosing and hence the forward portion of a step assembly 42 to an associated stringer 41 at each end of the step assembly. The rear portion of the step assembly 42 which has its forward end portion fastened as illustrated in FIGURE 10 of the drawings is fastened in position utilizing L-shaped fastening flange 53 and in a manner as previously described in this specification.

Another exemplary embodiment of the step assembly 42 of this invention is illustrated in FIGURES 12 and 13 of the drawings. The step assembly illustrated in FIGURES 12 and 13 is very similar to the step assembly 42; therefore, such step assembly will be designated generally by the numeral 42A and parts of step assembly 42A and associated structures which are similar to corresponding parts of step assembly 42 will be designated by the same numeral as step assembly 42 also followed by the letter designation A and not described again. Only those parts which are different from corresponding parts of step assembly 42 will be designated by a new numeral also followed by the letter designation A and described in detail.

The main difference between the step assembly 42A and 42 is that integral means is provided in the tread nosing 50A and riser 45A to enable fastening the forward portion of step assembly 42A in position. Thus, it is seen that the riser 45A has a substantially C-shaped rib 132A extending substantially the full length thereof and arranged in substantially parallel relation to the horizontal leg 66A and vertical leg 67A thereof. The C-shaped rib 132A is provided with a cutout 133A spaced inwardly from an end thereof and each cutout 133A is adapted to receive a threaded fastening nut 134A.

It is a simple matter to provide an aligned hole or opening 135A in an associated stringer 41A and fasten one end of the riser 45A in position simply by inserting an elongated threaded bolt 136A through an associated opening 135A and through an opening 137A provided in C-shaped fastening flange 132A and then threading through the nut 134A which is loosely held in cutout 133A to enable tread engagement. This technique enables the tightening of bolt 136A after initial tread engagement with nut 134A because nut 134A may be hexagonal or of similar configuration and dimensioned so that one of its flattened sides is positioned adjacent the lower surface of the lower horizontal leg 66A of riser 45A to prevent turning during tightening, whereby the installation of the step assembly 42A is very efficiently provided.

The tread nosing 50A comprising step assembly 42A also has a substantially C-shaped rib 140A provided as an integral part of its flange 73A and extending inwardly therefrom. The C-shaped rib 140A also has a cutout 141A provided therein. The stringer 41A is provided with a cooperating opening 142A which is similar to opening 135A and is adapted to enable the installation of a fastening bolt therethrough for fastening the tread nosing 50A and specifically the C-shaped rib 140A comprising such tread nosing in position. An identical-fastening nut 134A and bolt 136A is utilized in association with C-shaped rib 140A for fastening each end of tread nosing 50A in position upon holding the nut 134A in position within the cutout 141A and threading the bolt 136A in position to provide a firm attachment essentially as described in connection with C-shaped rib 132A.

The technique described for fastening step assembly 42A in position provides a high strength construction; also, upon inserting a bolt 136A through an associated opening in the stringer 41A and through the opening provided in an associated C-shaped rib a firm and adequate support is provided even if the fastening bolt were to subsequently work loose from its associated nut 134A.

Figure 15:
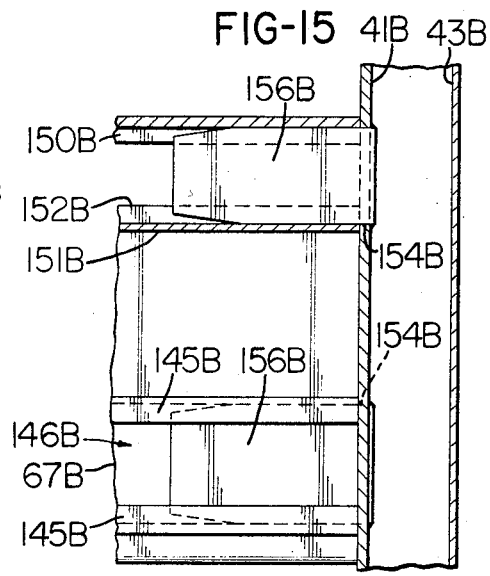
FIGURE 15 is a fragmentary view on the line 15—15 of FIGURE 14 with parts in section and parts broken away particularly illustrating the manner of fastening one end of the riser and tread nosing to an associated stringer using fastening wedges.

Another exemplary embodiment of the step assembly 42 of this invention is illustrated in FIGURES 14 and 15 of the drawings. The step assembly of FIGURES 14 and 15 is similar to the step assembly 42; therefore, such step assembly and associated structures will be designated generally by the numeral 42B and component parts thereof which are similar to corresponding parts of step assembly 42 will be designated by the same numeral as in step assembly 42 also followed by the letter designated B and not described again. Only those component parts which are different from corresponding parts of step assembly 42 will be designated by a new numeral also followed by the letter designation B and described in detail.

The step assembly 42B has simple supports for supporting riser 45B and the tread nosing 50B thereof in position. In particular, it will be seen that the lower portion of the vertical leg 67B of riser 45B has a pair of substantially L-shaped supporting flanges each designated by the same numeral 145B. The L-shaped supporting flanges 145B extend so that their vertical leg portions are arranged substantially parallel to the lower portion of vertical leg 67B and cooperate with leg 67B to define a substantially C-shaped rib which is designated generally by the numeral 146B and which is adapted to receive a fastening member in a manner as will be subsequently described.

Similarly, the tread nosing 50B is provided with a pair of integral flanges comprised of a straight flange 150B and a substantially L-shaped flange 151B. The flange 150B extends parallel to and in spaced apart relation from supporting flange 73B. The flange 151B has a vertical leg portion designated by the numeral 152B which is aligned with flange 150B and as will be apparent from FIGURE 14 of the drawings the flanges 150B, 152B, and 73B cooperate to define a substantially C-shaped supporting rib 153B which is utilized to fasten the tread nosing 50B in position upon receiving an associated fastening member therewithin.

The manner of fastening the sub-assembly 42B in position is highlighted as shown in FIGURE 15 of the drawings wherein an associated stringer 41B has a pair of elongated slots 154B provided therein and each having a substantially rectangular outline. Each slot 154B is arranged so as to be aligned with associated C-shaped ribs 146B and 153B. A fastening member shown in this example as a tapered fastening wedge 156B is provided for insertion through an associated rectangular slot 154B and through an associated C-shaped rib at 146B or 153B to thereby firmly attach and hold the forward end of the step assembly 42B in position in a simple manner. In some applications of this invention it may be desired to weld the wedge 156B to stringer 41B.

Figure 16:
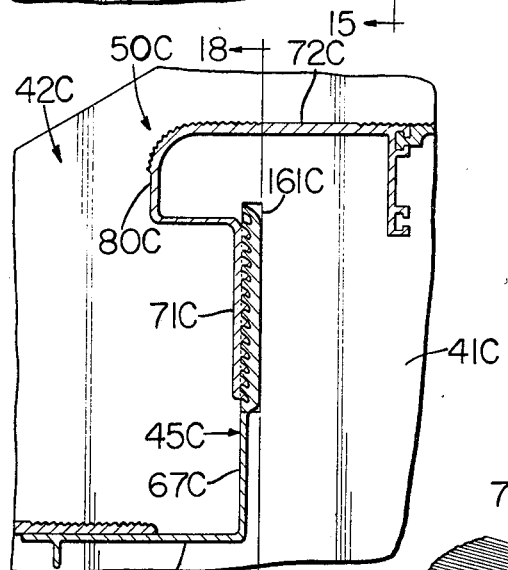
FIGURE 16 is a view similar to FIGURE 2 illustrating another embodiment of this invention in which each end of each step assembly is welded in position to an associated stringer.
Figure 18:
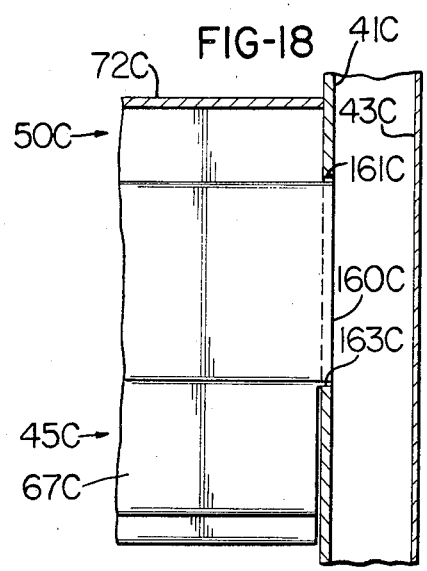
FIGURE 18 is a fragmentary view on the line 18—18 of FIGURE 16 particularly illustrating the slot in a stringer which is adapted to receive an associated projection extending from the vertical leg of a riser.
Figure 17:
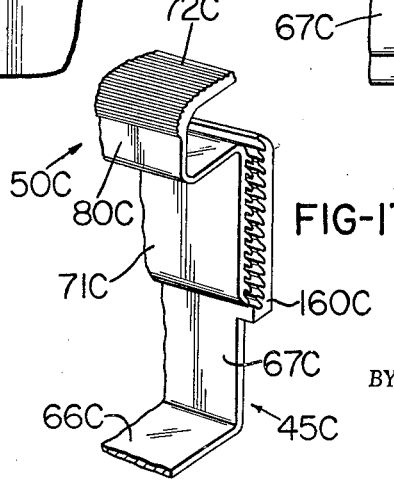
FIGURE 17 is a fragmentary perspective view particularly illustrating the vertical leg of the riser and an associated vertical leg of a tread nosing fastened together and illustrating the arrangement of a projection extending outwardly from one end of the riser which is adapted to be inserted through an associated slot in a stringer for welding.

Another exemplary embodiment of this invention is illustrated in FIGURES 16–18 of the drawings. The step assembly of FIGURES 16–18 is similar to the step assembly 42; therefore, as described previously in connection with the step assemblies 42A and 42B the step assembly of FIGURES 16–18 will be designated generally by the numeral 42C and parts thereof and associated structures which are very similar to corresponding parts of step assembly 42 will be designated by the same numeral as step assembly 42 also followed by the letter designation C and not described again. In connection with this embodiment it should be noted that the cross-sectional configurations of members 45C and 50C are identical to members 45 and 50 respectively.

The vertical leg portion 67C of riser 45C is suitably fastened to vertical leg 71C of tread nosing 50C which has the correct length and in a manner as previously described in connection with step assembly 42. A portion is then cut away from each end of leg portion 67C of riser 45C to thereby define a projection 160C extending from each end thereof and the resulting assembly of riser 45C and tread nosing 50C comprises the step assembly 42C. Each projection 160C is inserted in position through an associated opening 161C and as seen in FIGURE 18 of the drawings a lower edge 163C of projection 160C rests upon stringer 41C at the lower edge of its associated slot 161C. Each projection 160C and hence each end of step assembly 42C may then be fastened in position by welding to an associated stringer 41C.

Having described the various embodiments of the improved step assembly of this invention and the manner of supporting the risers, tread nosing, and tread pan in position in such various embodiments a detailed presentation will now be made of the preferred technique for forming the major component parts comprising each particular step assembly of this invention.

The riser 45 is preferably formed from an elongated extruded member 165 which is extruded through an associated die 166 as illustrated in FIGURE 19 of the drawings. The die 166 has an extrusion opening 167 provided therein so as to provide the desired configuration in the elongated member 165 from which riser 45 is made. Each elongated extruded member 165 has the cross-sectional configuration of riser 45 and it will be appreciated that each riser 45 is formed merely by cutting a desired length from member 165. The component parts of member 165 have been given the same reference numerals as corresponding parts in riser 45 for easy reference thereto and will not be described again.

The risers 45A and 45B previously described in this specification are also formed by extruding an associated elongated member through an associated die similar to die 166 which has its extrusion opening suitably modified to provide the identical cross-sectional configuration of either riser 45A or 45B and the particular elongated member is then cut to length to form the particular riser.

The tread nosing 50 comprising the step assembly 42 is also preferably formed by extruding an elongated member 170 through an associated die 171 as seen in FIGURE 20. Die 171 has an extrusion opening 172 provided therein so as to provide the desired configuration in member 170 from which the tread nosing 50 is made. The tread nosing 50 is formed by cutting the elongated extruded member 170 to the desired length. Also, it will be seen that the component parts of member 170 have been given the same reference numerals as corresponding parts of member 50 for easy reference thereto and will not be described again.

In a similar manner as described in connection with the embodiments 45A and 45B of riser 45, the manner of forming the embodiments 50A or 50B of the tread nosing 50 is not illustrated in the drawings. However, it will be appreciated that the tread nosings 50A and 50B will each also be similarly formed and cut to the desired length from an elongated member which is extruded through a die similar to die 171.

The tread pan 51 comprising the step assembly 42 is also preferably formed from an elongated extruded metal member which is illustrated in FIGURE 21 of the drawings and designated by the numeral 175. The elongated member 175 is extruded through an associated die 176 having a die opening 177 which corresponds to the configuration of member 175 and which has the cross-sectional configuration of pan 51. Thus, it is a simple manner to define a pan 51 merely by cutting the elongated member 175 to the desired length. The elongated member 175 has its component parts formed as an integral part thereof and for simplicity such parts have been designated by the same reference numerals as corresponding parts of the pan 51.

Any suitable metal may be utilized to form elongated members 165, 170, and 175. However, such members are preferably formed utilizing metal containing aluminum.

Reference is now made to FIGURE 22 which illustrates a fragmentary portion of the die 166 and the manner of extruding a plurality of grooves 70 in the vertical leg 67 of riser 45 and to FIGURE 23 which illustrates a portion of the die 171 and the manner of extruding a plurality of cooperating projections #74 in the tread nosing 50 which are adapted to be intermeshed within associated grooves 70 in the vertical leg portion 67. The manner in which a plurality of projections 74 are installed in position within associated grooves 70 is illustrated in FIGURE 24 of the drawings with the vertical legs 67 and 71 of riser 45 and tread nosing 50 respectively being held together prior to mechanically deforming the projections 74 within associated groove means 70 of the riser. It will be appreciated that the vertical legs 71 and 67 are then preferably mechanically compressed together so as to deform the projections in position so that they follow the contour of associated groove means 70 as shown in FIGURE 7 and previously described in connection with step assembly 42.

In the presentation of FIGURE 24 the projections 74 extend from vertical leg 71 of tread nosing 50 and the slots are provided in the vertical leg 67 of riser 45. However, it will be appreciated that the arrangement of the slots and grooves may be reversed so that in effect the slots are defined in the tread nosing 50 and the projections are defined in the riser 45.

Reference is now made to FIGURES 25 through 34 which illustrate a typical few of the many possible embodiments of interlocking projections and grooves which may be provided in either the riser or the tread nosing. However, for ease of presentation the fragmentary views illustrated in FIGURES 25–34 will be similar to the presentation of FIGURE 24 and will illustrate grooves in a riser shown on the right hand portion in each figure and cooperating projections in a tread nosing shown on the left hand portion prior to mechanically deforming such grooves and projections together.

Each riser of FIGURES 25–34 will be designated by the reference numeral 45 and grooves formed therein by the numeral 70; however, for each different figure a different letter designation will be used following the numeral designation. Similarly, each tread nosing of FIGURES 25–34 will be designated by the reference numeral 50 and the projections formed therein designated by the numeral 74; however, for each different figure a different letter designation will be used following the numeral designation and which is identical to the letter designation of the cooperating grooves of an associated riser.

The various projections shown in each figure are mechanically deformed within cooperating grooves and follow the contour thereof to provide a high strength connection essentially as shown in FIGURE 7 for the embodiment of grooves and projections illustrated and described in connection with FIGURE 2.

In the exemplary embodiments of this invention presented above the tread nosing 50 in each instance is fastened to an associated riser 45 directly and without the use of an intermediate member. However, it will be appreciated that an intermediate fastening member may be utilized and fastened to a tread nosing along one side and to a riser along its other side to provide a high structural strength attachment between the tread nosing and riser.

FIGURE 35 of the drawings shows an intermediate member designated by the numeral 180 which has an elongated central portion 181 and a plurality of symmetrically arranged projections 182 arranged to extend from opposite sides of the central portion 181. The corresponding riser 45 may have its vertical leg portion 67 provided with grooves designated by the numeral 183. Similarly, the vertical leg portion 71 of the tread nosing 50 may be provided with identical grooves also designated by the numeral 183. The riser 45 and tread nosing 50 of FIGURE 35 are attached together by inserting member 180 therebetween as shown in FIGURE 35 and compressing such members together so as to deform each projection 182 within an associated groove 183.

The above technique enables the utilization of an intermediate fastening member which can be designed to be more efficiently deformed than if it were made integrally with the riser or tread nosing. The provision of an intermediate member 180 makes it possible to standardize on the preferred type of groove to be defined in each riser and tread nosing.

FIGURE 36 illustrates another technique for fastening a riser and tread nosing wherein a plurality of projections are provided extending from both an associated vertical leg portion 67 of a riser 45 and vertical leg portion 71 of a tread nosing 50. For ease of presentation the projections have been designated by the same numeral 185 in each instance. An intermediate member 190 is utilized in connection with the presentation of FIGURE 36 and intermediate member 190 in this instance has a contoured configuration defined by a plurality of grooves 186 extending inwardly from its opposite side edges. Each groove 186 is adapted to receive an associated projection 185 extending from a riser 45 or a tread nosing 50.

In each instance it will be seen that upon urging the vertical leg portion 67 of riser 45 and vertical leg portion 71 of tread nosing 50 together each projection 185 is deformed within an associated groove 186 to provide a strong mechanical connection.

Thus, it is seen that an intermediate member may be effectively utilized to interlock a pair of cooperating members of the step assembly together. Further, each intermediate member may also be economically formed as by extruding.

While present preferred embodiments of this invention have been illustrated and described, it will be recognized that this invention may be otherwise variously embodied and practiced within the scope of the following claims:

What is claimed is:

1. A substantially L-shaped tread nosing for a step assembly said tread nosing comprising a vertical leg portion and a horizontal leg portion which terminates in a supporting flange, nonskid means disposed on said horizontal leg portion, said vertical leg portion being a single rectilinear member having a plurality of spaced projections extending outwardly from one of its vertical surfaces and across the full length thereof, each of said projections extending outwardly a distance which enables the outer end portion thereof to be intermeshed and mechanically deformed in a hooking manner within a cooperating contoured groove in an adjoining member of said step assembly to follow the contour of said cooperating groove and mechanically interlock said tread nosing and member together in a high strength manner, and said projections enabling the vertical distance between adjacent horizontal treads of a stairway to be incrementally adjusted.

2. A tread nosing as set forth in claim 1 made by cutting an elongated extruded member to length and having said plurality of projections provided in said vertical leg portion as an integral part thereof.

3. A tread nosing as set forth in claim 2 in which said vertical leg portion has an outwardly offset portion defining its upper end which is provided with an arcuate transition surface between said vertical leg portion and said horizontal leg portion and said spaced projections extending over the major portion of the height of said vertical leg portion to enable greater incremental adjustment of said vertical distance.

4. A tread nosing as set forth in claim 2 in which said supporting flange extends substantially vertically downwardly beneath said horizontal leg portion in substantially parallel relation to said vertical leg portion.

5. A substantially L-shaped tread nosing for a step assembly said tread nosing comprising a vertical leg portion and a horizontal leg portion which terminates in a supporting flange, said vertical leg portion having a plurality of projections extending the full length thereof and each of said projections being adapted to be intermeshed within a cooperating groove of an adjoining member of said step assembly, said projections enabling the vertical distance between adjacent horizontal treads of a stairway to be incrementally adjusted, said tread nosing being made by cutting an elongated extruded member to length and having said plurality of projections provided in said vertical leg portion as an integral part thereof, said supporting flange extending substantially vertically downwardly beneath said horizontal leg portion in substantially parallel relation to said vertical leg portion, and said supporting flange having an upper and a lower slot provided therein across the full length thereof in parallel spaced apart relation and adapted to receive a cooperating tongue of a tread pan to be fastened thereto.

6. A tread nosing as set forth in claim 5 in which said upper and lower slots are each T-shaped and adapted to be deformed against an associated cooperating tongue to be received therewithin to provide a rattle-free construction.

References Cited

UNITED STATES PATENTS

| | | | |
|---|---|---|---|
| 1,674,713 | 6/1928 | Brooks | 52—179 |
| 2,926,928 | 3/1960 | Bennett | 52—588 |
| 3,022,857 | 2/1962 | Rich | 182—228 X |
| 3,381,775 | 5/1968 | Livers | 52—182 X |

FOREIGN PATENTS 953,706   1964   Great Britain.

JOHN E. MURTAGH, Primary Examiner